US007531609B2

(12) United States Patent
Resconi et al.

(10) Patent No.: US 7,531,609 B2
(45) Date of Patent: May 12, 2009

(54) PROCESS FOR THE PREPARATION OF 1-BUTENE/PROPYLENE COPOLYMERS

(75) Inventors: Luigi Resconi, Ferrara (IT); Simona Guidotti, Altedo di Malalbergo-Bologna (IT); Friederike Morhard, Bangkok (TH); Anna Fait, Ferrara (IT)

(73) Assignee: Basell Poyloefine GmbH, Wesseling (DE)

( * ) Notice: Subject to any disclaimer, the term of this patent is extended or adjusted under 35 U.S.C. 154(b) by 0 days.

(21) Appl. No.: 11/667,350

(22) PCT Filed: Oct. 20, 2005

(86) PCT No.: PCT/EP2005/055434

§ 371 (c)(1),
(2), (4) Date: Jun. 11, 2007

(87) PCT Pub. No.: WO2006/051035

PCT Pub. Date: May 18, 2006

(65) Prior Publication Data

US 2007/0299223 A1    Dec. 27, 2007

Related U.S. Application Data

(60) Provisional application No. 60/627,711, filed on Nov. 12, 2004.

(30) Foreign Application Priority Data

Nov. 9, 2004  (EP) .................... 04105625

(51) Int. Cl.
    C08F 4/42    (2006.01)
(52) U.S. Cl. .................. 526/161; 526/160; 526/351; 526/348.6
(58) Field of Classification Search ............... 526/351, 526/348.6, 161, 160
    See application file for complete search history.

(56) References Cited

U.S. PATENT DOCUMENTS

| | | | |
|---|---|---|---|
| 5,145,819 A |   | 9/1992 | Winter et al. |
| 5,169,924 A | * | 12/1992 | Asanuma et al. ......... 526/348.6 |
| 5,239,022 A |   | 8/1993 | Winter et al. |
| 5,243,001 A |   | 9/1993 | Winter et al. |
| 5,324,800 A |   | 6/1994 | Welborn, Jr. et al. |
| 5,556,928 A |   | 9/1996 | Devore et al. |
| 6,051,728 A |   | 4/2000 | Resconi et al. |
| 6,084,048 A | * | 7/2000 | Hozumi et al. ........... 526/348.6 |
| 6,444,833 B1 |   | 9/2002 | Ewen et al. |
| 6,451,724 B1 |   | 9/2002 | Nifant'ev et al. |
| 6,518,386 B1 | * | 2/2003 | Resconi et al. ............. 526/351 |
| 6,559,252 B1 |   | 5/2003 | Horton et al. |
| 6,608,224 B2 |   | 8/2003 | Resconi et al. |
| 6,635,779 B1 |   | 10/2003 | Ewen et al. |
| 6,841,501 B2 |   | 1/2005 | Resconi et al. |
| 6,878,786 B2 |   | 4/2005 | Resconi et al. |
| 6,953,829 B2 |   | 10/2005 | Kratzer et al. |
| 7,101,940 B2 |   | 9/2006 | Schottek et al. |
| 7,112,638 B2 |   | 9/2006 | Nifant'ev et al. |
| 7,141,527 B1 |   | 11/2006 | Van Baar et al. |
| 7,141,637 B2 |   | 11/2006 | Elder et al. |
| 7,166,683 B2 |   | 1/2007 | Resconi |
| 2004/0132612 A1 |   | 7/2004 | Resconi et al. |
| 2004/0254315 A1 |   | 12/2004 | Resconi |
| 2005/0192418 A1 |   | 9/2005 | Ewen et al. |
| 2006/0084769 A1 |   | 4/2006 | Resconi et al. |
| 2006/0094840 A1 |   | 5/2006 | Resconi et al. |

FOREIGN PATENT DOCUMENTS

| | | |
|---|---|---|
| DE | 19962814 | 6/2001 |
| DE | 19962910 | 7/2001 |
| EP | 129368 | 12/1984 |
| EP | 485820 | 5/1992 |
| EP | 485822 | 5/1992 |
| EP | 485823 | 5/1992 |
| EP | 2001172334 | 6/2001 |
| EP | 1260525 | 11/2002 |
| WO | 91/02012 | 2/1991 |
| WO | 92/00333 | 1/1992 |
| WO | 96/22995 | 8/1996 |
| WO | 98/22486 | 5/1998 |
| WO | 99/21899 | 5/1999 |
| WO | 99/24446 | 5/1999 |

(Continued)

OTHER PUBLICATIONS

L. Resconi et al., "Selectivity in Propene Polymerization with Metallocence Catalysts," *Chem. Rev.*, vol. 100(4), p. 1253-1345 (2000).

J. Randall, "A Review of High Resolution Liquid $^{13}$Carbon Nuclear Magnetic Resonance Characterizations of Ethylene-Based Polymers," *JMS-Rev. Macromol. Chem. Phys.*, vol. C29(2&3), p. 201-317 (1989).

(Continued)

*Primary Examiner*—Ling-Siu Choi
(74) *Attorney, Agent, or Firm*—William R. Reid

(57) ABSTRACT

A solution polymerization process for obtaining isotactic, crystalline or crystallizable 1-butene/propylene polymers comprising contacting under polymerization conditions at a temperature ranging from 50° C. to 90° C. 1-butene and propylene in the presence of a catalyst system obtainable by contacting:

a) at least one metallocene compound;
  b) an alumoxane or a compound capable of forming an alkyl metallocene cation; and optionally
  c) an organo aluminum compound;

wherein the polymerization medium consists of a mixture of 1-butene and propylene wherein the content of propylene in the liquid phase ranges from 1% to 60% by weight.

9 Claims, No Drawings

FOREIGN PATENT DOCUMENTS

| | | |
|---|---|---|
| WO | 99/58539 | 11/1999 |
| WO | 01/21674 | 3/2001 |
| WO | 01/44318 | 6/2001 |
| WO | 01/47939 | 7/2001 |
| WO | WO 01/47939 A1 * | 7/2001 |
| WO | 01/62764 | 8/2001 |
| WO | 02/100908 | 12/2002 |
| WO | 02/102811 | 12/2002 |
| WO | 03/042258 | 5/2003 |
| WO | 03/045964 | 6/2003 |
| WO | WO 03/045964 A1 * | 6/2003 |
| WO | 2004/005360 | 1/2004 |
| WO | 2004/050713 | 6/2004 |
| WO | 2005/095468 | 10/2005 |

OTHER PUBLICATIONS

H. Cheng, $^{13}$C NMR Analysis of Propylene-Butylene Copolymers by a Reaction Probability Model, *Journal of Polymer Science, Polymer Physics Edition*, vol. 21, p. 573-581 (1983).

C. Carman et al., "Monomer Sequence Distribution in Ethylene-Propylene Rubber Measured by $^{13}$C NMR. 3. Use of Reaction Probability Model," *Macromolecules*, vol. 10(3), p. 536-544 (1977).

L. Resconi et al., "Ne2 Catalysts Design for the Simultaneous Control over Polypropylene Molecular Mass and Stereoregularity," *Polymeric Materials: Science & Engineering*, vol. 87, p. 76-77 (2002) XP008018078.

\* cited by examiner

PROCESS FOR THE PREPARATION OF 1-BUTENE/PROPYLENE COPOLYMERS

This application is the U.S. national phase of International Application PCT/EP2005/055434, filed Oct. 20, 2005, claiming priority to European Patent Application 04105625.0 filed Nov. 9, 2004, and the benefit under 35 U.S.C. 119(e) of U.S. Provisional Application No. 60/627,711, filed Nov. 12, 2004; the disclosures of International Application PCT/EP2005/055434, European Patent Application 04105625.0 and U.S. Provisional Application No. 60/627,711, each as filed, are incorporated herein by reference.

The present invention relates to a process for the preparation of isotactic copolymers of 1-butene and propylene carried out in solution wherein the reaction medium is a mixture of monomers in which the content of propylene is between 1 and 60% by weight. Said process being carried out by using a metallocene-based catalyst system.

1-butene propylene copolymers are known in the art, they are prepared both by using titanium-based catalyst systems (Ziegler-Natta) or metallocene-based catalyst systems. Focusing on copolymer obtained by using metallocene-based catalyst systems, JP 2001-172334-A relates to a 1-butene propylene copolymer containing from 25 to 60% by mol of propylene and from 40 to 75 mol % of 1-butene polymer units. This copolymer is obtained by using a metallocene compound supported on an inert carrier and the examples are carried out at 40° C. In example 8 of EP 1 260 525 a 1-butene propylene copolymer having a propylene content of 3.3 mol % is obtained by using a double bridge metallocene compound and a mixture of 20 ml of heptane and 200 ml of 1-butene as polymerization medium. The obtained copolymer shows a low isotacticity. U.S. Pat. No. 5,169,924 relates to a copolymer comprising from 20 to 63 wt % of propylene and from 37 to 80 weight % of 1-butene. In example 2 a syndiotactic copolymer having a 1-butene content of 39.4% wt is obtained. However the polymerization is not carried out in solution but in slurry, since in order to recover the obtained polymer the content of the reactor was filtered. U.S. Pat. No. 6,084,048 describes a propylene 1-butene copolymer having certain features and being obtained by using a monocyclopentadienyl metallocene compound. In the examples the polymerization is carried out by using toluene as polymerization medium.

Isotactic 1-butene propylene copolymers obtained by using metallocene-based catalyst system are quite different from the copolymers obtained by using a titanium based catalyst system. In fact, the copolymers obtained by using metallocene based catalyst system are generally endowed with a narrower distribution of molecular weight and a more homogeneous distribution of the comonomer in the copolymer chain.

There is still the need to find a process able to give isotactic, crystalline or crystallisable 1-butene propylene copolymers in an easy way and in high yields.

This problem has been solved according to the present invention by carrying out the polymerization in solution by using the monomers mixture as polymerization medium under specific conditions of temperature and composition of polymerization medium. In this way, since the copolymers are dissolved in the polymerization medium, problems regarding the fouling in the reactor are avoided. This is an important aspect because copolymers, especially those ones having high comonomer content, are very sticky. Moreover by using the monomers mixture as polymerization medium, the yield of process is strongly increased, due to the higher concentration of the reactants. Furthermore when the polymerization is carried out according to the claimed conditions the presence of propylene strongly increases the yield of the process. The fact that organic solvents are not used allows to avoid, in industrial plants, the use of expensive solvent recycling tools, with consequently energy savings. Finally by avoiding the use of huge amounts of organic solvents, especially aromatic ones, the polymers result compatible with food contact applications.

Therefore an object of the present invention is a solution polymerization process for obtaining isotactic, crystalline or crystallisable 1-butene/propylene polymers comprising contacting under polymerization conditions at a temperature ranging from 50° C. to 90° C. 1-butene and propylene in the presence of a catalyst system obtainable by contacting:
a) at least one metallocene compound;
b) an alumoxane or a compound capable of forming an alkyl metallocene cation; and optionally
c) an organo aluminum compound;

wherein the polymerization medium consists of a mixture of 1-butene and propylene wherein the content of propylene in the liquid phase ranges from 1% to 60% by weight; and wherein the catalyst system obtainable by contacting the above a), b) and optionally c) is not supported on an inert carrier.

For the purpose of the present invention an inert carrier is a solid compound able to adsorb chemically or physically one or more components a), b) or optionally c) or the reaction product thereof of the catalyst system on the surface. Examples of an inert carrier are silica, alumina, Al—Si, Al—Mg mixed oxides, magnesium halides, organic polymer such as styrene/divinylbenzene copolymers, polyethylene or polypropylene. For the purpose of the present invention an inert carrier is considered also a prepolymer prepared by means of a preliminary prepolymerization of the catalyst system containing components a), b) and optionally c).

For the purpose of the present invention the term solution polymerization means that the polymer is completely soluble in the polymerization medium at the polymerization temperature used, and in a concentration range of 5 to 30% by weight.

In the process of the present invention the polymerization temperature ranges from 50° C. to 90° C.; more preferably it ranges from 60° C. to 80° C.; even more preferably from 70° C. to 80° C. This polymerization temperature range allows an optimum balance between the activity of the metallocene-based catalyst and the solubility of the polymer.

The polymerization medium consists of a mixture of 1-butene and propylene. The propylene content in the mixture can be varied according to the final comonomer content wished in the copolymer and the relative reactivity ratio of the comonomers (1-butene and propylene) that depends on the metallocene used. The propylene content in the liquid phase of the polymerization medium preferably ranges from 5% to 60% by weight; more preferably from 10% to 45% by weight.

According to the process of the present invention the metallocene based catalyst system is not supported on an inert carrier, this allows to increase the activity of the catalyst system, since supported metallocene-based catalyst systems have lower activity that unsupported ones. Preferably the catalyst system is in the form of catalytic solution, the catalytic solution can be obtained, for example by solubilizing the reaction product of the metallocene compound a) and an alumoxane or a compound capable of forming an alkyl metallocene cation; b) in an aliphatic or aromatic solvent such as toluene, hexane, cyclohexane or isododecane. An advantageous catalytic solution can be obtained according to a process comprising the following steps:

a) contacting a solution of methylalumoxane (MAO) in an aromatic solvent (solvent a) with a solution in a solvent (solvent b) of one or more alumoxanes different from methylalumoxane or one or more organo-aluminium compound of formula $H_jAlU'_{3-j}$ or $H_jAl_2U'_{6-j}$, where the U' substituents, same or different, are hydrogen atoms, halogen atoms, or hydrocarbon group containing from 2 to 20 carbon atoms, optionally containing silicon or germanium atoms, with the proviso that at least one U' is different from halogen and from hydrogen, and j ranges from 0 to 1, being also a non-integer number;

(b) when solvent b) is an aromatic solvent or solvent b) has a boiling point lower than solvent a) adding to the solution formed in step a) an alifatic solvent (solvent c) having a boiling point higher than solvent a) and solvent b);

(c) solubilizing a metallocene compound in the solution obtained in step a) or in step b); and (d) substantially removing the aromatic solvent(s) (solvent a) or solvent a) and solvent b). if step b) has been carried out) from the solution.

wherein the content of the aromatic solvent(s) in the solution obtained in step d) is lower than 2% by weight; preferably equal to or lower than 1% by weight; the molar concentration of the metallocene compound in the final solution obtained in step d) ranges from $1 \cdot 10^{-5}$ to $1 \cdot 10^{-1}$ mol/l, and the molar ratio between methylalumoxane and the organo-aluminium compound or the molar ratio between methylalumoxane and the alumoxane used in step b) ranges from 10:1 to 1:10; preferably it ranges from 5:1 to 1:5; more preferably from 3:1 to 1:3.

Processes of this type are described in EP 04101020.8.

With the process of the present invention 1-butene propylene copolymers containing up to 60% by mol of propylene derived units can be obtained. Preferably the content of propylene derived units ranges from 0.5% by mol to 60% by mol, more preferably the content of propylene derived units ranges from 5% by mol to 55% by mol; even more preferably it ranges from 30% by mol to 50% by mol; still more preferably the content of propylene derived units ranges from 33% by mol to 43% by mol.

For the purpose of the present invention metallocene compounds are compounds containing at least a cyclopentadienyl skeleton bound through a n-bond to a central metal atom belonging to group 4, 5 or to the lanthanide or actinide groups of the Periodic Table of the Elements; preferably the central metal atom is zirconium, or hafnium.

A preferred class of metallocene compounds have the following formula (I).

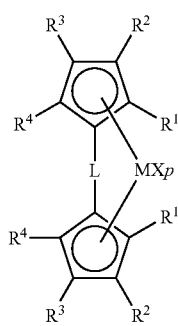
(I)

wherein:
the compounds of formula (I) have $C_1$ or $C_2$ or $C_2$-like symmetry;

M is a transition metal belonging to group 4 of the Periodic Table of the Elements;
preferably M is zirconium, or hafnium;
the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl group, optionally containing one or more Si or Ge atoms; the substituents X are preferably the same and are preferably hydrogen, halogen, $R^6$ or $OR^6$; wherein $R^6$ is preferably a $C_1$-$C_7$ alkyl, $C_6$-$C_{14}$ aryl or $C_7$-$C_{14}$ arylalkyl group, optionally containing one or more Si or Ge atoms; more preferably, the substituents X are Cl or Me.

p is an integer equal to the oxidation state of the metal M minus 2; preferably p is 2;

L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or $C_7$-$C_{20}$ arylalkylidene radicals optionally containing heteroatoms belonging to groups 13-17 of the Periodic Table of the Elements, and silylidene radical containing up to 5 silicon atoms such as $SiMe_2$, $SiPh_2$; preferably L is a divalent group $(ZR^7_m)_n$; Z being C, Si, Ge, N or P, and the $R^7$ groups, equal to or different from each other, being hydrogen or linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl groups or two $R^7$ can form a alifatic or aromatic $C_4$-$C_7$ ring;

more preferably L is selected from $Si(CH_3)_2$, $SiPh_2$, SiPhMe, $SiMe(SiMe_3)$, $CH_2$, $(CH_2)_2$, $(CH_2)_3$ or $C(CH_3)_2$;

$R^1$, $R^2$, $R^3$, and $R^4$, equal to or different from each other, are hydrogen atoms, or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radicals, optionally containing one or more heteroatoms belonging to groups 13-17 of the Periodic Table of the Elements; or two adjacent $R^1$, $R^2$, $R^3$ and $R^4$ form one or more 3-7 membered ring optional containing heteroatoms belonging to groups 13-17 of the periodic table; such as to form with the cyclopentadienyl moiety the following radicals: indenyl; mono-, di-, tri- and tetra-methyl indenyl; 2-methyl indenyl, 3-$^t$butyl-indenyl, 2-isopropyli-4-phenyl indenyl, 2-methyl4-phenyl indenyl, 2-methyl-4,5 benzo indenyl; 3-trimethylsilyl-indenyl; 4,5,6,7-tetrahydroindenyl; fluorenyl; 5,10-dihydroindeno[1,2-b]indol-10-yl; N-methyl- or N-phenyl-5,10-dihydroindeno [1,2-b]indol-10-yl; 5,6-dihydroindeno[2,1-b]indol-6-yl; N-methyl- or N-phenyl-5,6-dihydroindeno[2,1-b]indol-6-yl; azapentalene-4-yl; thiapentalene-4-yl; azapentalene-6-yl; thiapentalene-6-yl; mono-, di- and tri-methyl-azapentalene-4-yl, 2,5-dimethyl-cyclopenta[1,2-b: 4,3-b']-dithiophene.

Non limiting examples of compounds belonging to formula (I) are the following compounds:
dimethylsilanediylbis(indenyl)zirconium dichloride,
dimethylsilanediylbis(2-methyl-4-phenylindenyl)zirconium dichloride,
dimethylsilanediylbis(2-methyl-4-naphthylindenyl)zirconium dichloride,
dimethylsilanediylbis(2-methylindenyl)zirconium dichloride,
dimethylsilanediylbis(2-methyl-4-isopropylindenyl)zirconium dichloride,
dimethylsilanediylbis(2,4-dimethylindenyl)zirconium dichloride,
dimethylsilanediylbis(2-methyl-4,5-benzoindenyl)zirconium dichloride, dimethylsilanediylbis(2,4,7-trimethylindenyl)zirconium dichloride,
dimethylsilanediylbis(2,4,6-trimethylindenyl)zirconium dichloride,
dimethylsilanediylbis(2,5,6-trimethylindenyl)zirconium dichloride,
dimethylsilanediylbis(2-isopropyl-4-(4'-tert-butyl)-phenyl-Indenyl)(2,7-Methyl-4-(4'-tert-butyl)-Phenyl-Indenyl)-zirconium dichloride,
dimethylsilanediylbis(2-isopropyl-4-(4'-tert-butyl)-phenyl-Indenyl)(2-Methyl-4-(4'-tert-butyl)-Phenyl-Indenyl)-zirconium dichloride,
dimethylsilanediylbis(2-isopropyl-4-phenyl-Indenyl)(2-Methyl-4-Phenyl-Indenyl)-zirconium dichloride,
methyl(phenyl)silanediylbis(2-methyl-4,6-diisopropylindenyl)-zirconium dichloride,
methyl(phenyl)silanediylbis(2-methyl-4-isopropylindenyl)-zirconium dichloride,
1,2-ethylenebis(indenyl)zirconium dichloride,
1,2-ethylenebis(4,7-dimethylindenyl)zirconium dichloride,
1,2-ethylenebis(2-methyl-4-phenylindenyl)zirconium dichloride,
1,2-ethylenebis(2-methyl-4,6-diisopropylindenyl)zirconium dichloride,
1,2-ethylenebis(2-methyl-4,5-benzoindenyl)zirconium dichloride,
dimethylsilanediyl(3-tert-butyl-cyclopentadienyl)(9-fluorenyl)zirconium dichloride,
dimethylsilandiylbis-6-(3-methylcyclopentadienyl-[1,2-b]-thiophene) dichloride;
dimethylsilandiylbis-6-(4-methylcyclopentadienyl-[1,2-b]-thiophene)zirconium dichloride;
dimethylsilandiylbis-6-(4-isopropylcyclopentadienyl-[1,2-b]-thiophene)zirconium dichloride;
dimethylsilandiylbis-6-(4-ter-butylcyclopentadienyl-[1,2-b]-thiophene)zirconium dichloride;
dimethylsilandiylbis-6-(3-isopropylcyclopentadienyl-[1,2-b]-thiophene)zirconium dichloride;
dimethylsilandiylbis-6-(3-phenylcyclopentadienyl-[1,2-b]-thiophene)zirconium dichloride;
dimethylsilandiylbis-6-(2,5-dichloride-3-phenylcyclopentadienyl-[1,2-b]-thiophene)zirconium di methyl;
dimethylsilandiylbis-6-[2,5-dichloride-3-(2-methylphenyl)cyclopentadienyl-[1,2-b]-thiophene]zirconium dichloride;
dimethylsilandiylbis-6-[2,5-dichloride-3-(2,4,6-trimethylphenyl)cyclopentadienyl-[1,2-b]-thiophene]zirconium dichloride;
dimethylsilandiylbis-6-[2,5-dichloride-3-mesitylenecyclopentadienyl-[1,2-b]-thiophene]zirconium dichloride;
dimethylsilandiylbis-6-(2,4,5-trimethyl-3-phenylcyclopentadienyl-[1,2-b]-thiophene)zirconium dichloride;
dimethylsilandiylbis-6-(2,5-diethyl-3-phenylcyclopentadienyl-[1,2-b]-thiophene)zirconium dichloride;
dimethylsilandiylbis-6-(2,5-diisopropyl-3-phenylcyclopentadienyl-[1,2-b]-thiophene)zirconium dichloride;
dimethylsilandiylbis-6-(2,5-diter-butyl-3-phenylcyclopentadienyl-[1,2-b]-thiophene)zirconium dichloride;
dimethylsilandiylbis-6-(2,5-ditrimethylsilyl-3-phenylcyclopentadienyl-[1,2-b]-thiophene)zirconium dichloride;
dimethylsilyl{(2-methyl-1-indenyl)-7-(2,5-dimethyl-cyclopenta[1,2-b:4,3-b']-dithiophene)}zirconium dichloride
dimethylsilyl{(2,4,7-trimethyl-1-indenyl)-7-(2,5-dimethyl-cyclopenta[1,2-b:4,3-b']-dithiophene)}zirconium dichloride
dimethylsilyl{(2,4,6-trimethyl-1-indenyl)-7-(2,5-dimethyl-cyclopenta[1,2-b:4,3-b']-dithiophene)}zirconium dichloride as well as the corresponding dimethyl, chloromethyl, dihydro and $\eta^4$-butadiene compounds.

Suitable metallocene complexes belonging to formulas (I), or (II) are described in WO 98/22486, WO 99/58539 WO 99/24446, U.S. Pat. No. 5,556,928, WO 96/22995, EP-485822, EP-485820, U.S. Pat. No. 5,324,800, EP-A-0 129 368, U.S. Pat. No. 5,145,819, EP-A-0 485 823, WO 01/47939, WO 01/44318 and PCT/EP02/13552.

The terms $C_1$ and $C_2$ symmetry are described in *Chem. Rev.* 2000, 100, 1253-1345. For the purpose of the present invention the term $C_2$-like means that the bulkier substituents of the two cyclopentadienyl moieties on the metallocene compound are on the opposite side with respect to the plane containing the zirconium and the centre of the said cyclopentadienyl moieties as shown in the following compound:

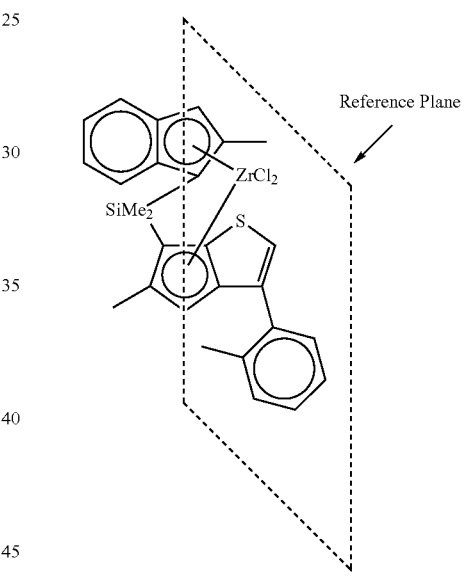

Preferred metallocene compounds to be used in the process according to the present invention have formula (II) and (III)

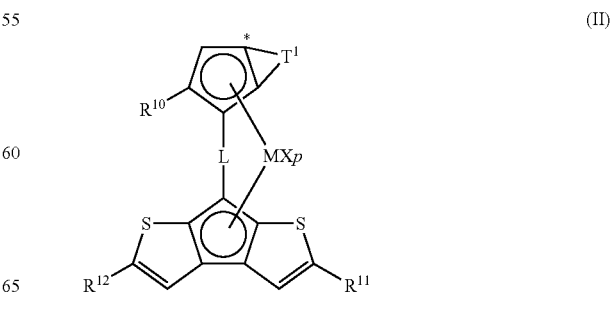

(II)

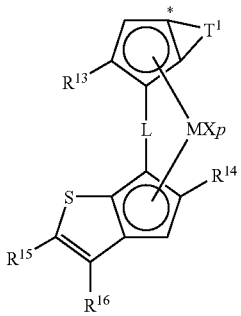

(III)

wherein M, X, p, and L are described above;

in the compound of formula (II):

R$^{10}$ is a hydrogen atom, or a C$_1$-C$_{40}$ hydrocarbon radicals optionally containing heteroatoms belonging to groups 13-17 of the Periodic Table of the Elements; Preferably R$^{10}$ is a hydrogen atom or a linear or branched, cyclic or acyclic, C$_1$-C$_{40}$-alkyl, C$_2$-C$_{40}$ alkenyl, C$_2$-C$_{40}$ alkynyl, C$_6$-C$_{40}$-aryl, C$_7$-C$_{40}$-alkylaryl or C$_7$-C$_{40}$-arylalkyl radicals; optionally containing heteroatoms belonging to groups 13-17 of the Periodic Table of the Elements; more preferably R$^{10}$ is linear or branched, saturated or unsaturated C$_1$-C$_{20}$-alkyl radicals, optionally containing heteroatoms belonging to groups 13-17 of the Periodic Table of the Elements; even more preferably R$^{10}$ is a C$_1$-C$_{10}$-alkyl radical such as a methyl, or ethyl radical;

R$^{11}$ and R$^{12}$, equal to or different from each other, are hydrogen atoms or C$_1$-C$_{40}$ hydrocarbon radicals optionally containing heteroatoms belonging to groups 13-17 of the Periodic Table of the Elements; preferably R$^{11}$ and R$^{12}$ are linear or branched, cyclic or acyclic, C$_1$-C$_{40}$-alkyl, C$_2$-C$_{40}$ alkenyl, C$_2$-C$_{40}$ alkynyl, C$_6$-C40-aryl, C$_7$-C$_{40}$-alkylaryl or C$_7$-C$_{40}$-arylalkyl radicals; optionally containing heteroatoms belonging to groups 13-17 of the Periodic Table of the Elements; more preferably R$^{11}$ and R$^{12}$ are linear or branched, C$_1$-C$_{20}$-alkyl radicals, such as methyl or ethyl radicals;

T$^1$ is a moiety of formula (IIa) or (IIb):

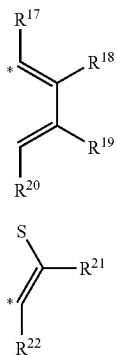

(IIa)

(IIb)

wherein the atom marked with the symbol*bonds the atom marked with the same symbol in the compound of formula (II);

R$^{17}$, R$^{18}$ R$^{19}$ and R$^{20}$, equal to or different from each other, are hydrogen atoms, or C$_1$-C$_{40}$ hydrocarbon radicals optionally containing heteroatoms belonging to groups 13-17 of the Periodic Table of the Elements; or two adjacent R$^{17}$, R$^{18}$ R$^{19}$ and R$^{20}$ can optionally form a saturated or unsaturated, 5 or 6 membered rings, said ring can bear C$_1$-C$_{20}$ alkyl radicals as substituents; Preferably R$^{17}$, R$^{18}$ R$^{19}$ and R$^{20}$ are hydrogen atoms or linear or branched, cyclic or acyclic, C$_1$-C$_{40}$-alkyl, C$_2$-C$_{40}$ alkenyl, C$_2$-C$_{40}$ alkynyl, C$_6$-C$_{40}$-aryl, C$_7$-C$_{40}$-alkylaryl or C$_7$-C$_{40}$-arylalkyl radicals; optionally containing heteroatoms belonging to groups 13-17 of the Periodic Table of the Elements;

R$^{17}$ is preferably a linear or branched, saturated or unsaturated C$_1$-C$_{20}$-alkyl radical, optionally containing heteroatoms belonging to groups 13-17 of the Periodic Table of the Elements; more preferably R$^{17}$ is a C$_1$-C$_{10}$-alkyl radical; even preferably R$^{17}$ is a methyl, ethyl or isopropyl radical;

R$^{18}$ is preferably a hydrogen atom

R$^{19}$ is preferably a hydrogen atom or a C$_1$-C$_{10}$-alkyl radical such as a methyl, ethyl or isopropyl radical;

R$^{20}$ is preferably a hydrogen atom or linear or branched, saturated or unsaturated C$_1$-C$_{20}$-alkyl radical, optionally containing heteroatoms belonging to groups 13-17 of the Periodic Table of the Elements; preferably a C$_1$-C$_{10}$-alkyl radical; even preferably R$^{20}$ is a methyl or ethyl radical;

R$^{21}$ and R$^{22}$, equal to or different from each other, are hydrogen atoms or C$_1$-C$_{40}$ hydrocarbon radicals optionally containing heteroatoms belonging to groups 13-17 of the Periodic Table of the Elements; preferably R$^{21}$ and R$^{22}$ are hydrogen atoms or linear or branched, cyclic or acyclic, C$_1$-C$_{40}$-alkyl, C$_2$-C$_{40}$ alkenyl, C$_2$-C$_{40}$ alkynyl, C$_6$-C$_{40}$-aryl, C$_7$-C$_{40}$-alkylaryl or C$_7$-C$_{40}$-arylalkyl radicals; optionally containing heteroatoms belonging to groups 13-17 of the Periodic Table of the Elements;

more preferably R$^{21}$ is a hydrogen atom or a linear or branched, cyclic or acyclic C$_1$-C$_{20}$-alkyl radical; even more preferably R$^{21}$ is a methyl or ethyl radical;

preferably R$^{22}$ is a C$_1$-C$_{40}$-alkyl, C$_6$-C$_{40}$-aryl or a C$_7$-C$_{40}$-arylalkyl radical; more preferably R$^{22}$ is a moiety of formula (IV)

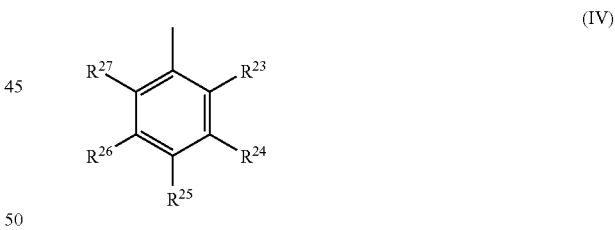

(IV)

wherein R$^{23}$, R$^{24}$, R$^{25}$, R$^{26}$ and R$^{27}$, equal to or different from each other, are hydrogen atoms or C$_1$-C$_{20}$ hydrocarbon radicals; preferably R$^{23}$, R$^{24}$, R$^{25}$, R$^{26}$ and R$^{27}$ are hydrogen atoms or linear or branched, cyclic or acyclic, C$_1$-C$_{20}$-alkyl, C$_2$-C$_{20}$ alkenyl, C$_2$-C$_{20}$ alkynyl, C$_6$-C$_{20}$-aryl, C$_7$-C$_{20}$-alkylaryl or C$_7$-C$_{20}$-arylalkyl radicals; more preferably R$^{23}$, and R$^{26}$ are a hydrogen atoms; R$^{24}$, R$^{25}$ and R$^{26}$ are more preferably hydrogen atoms or linear or branched, cyclic or acyclic, C$_1$-C$_{10}$-alkyl radicals;

in the compound of formula (III):

R$^{13}$ and R$^{14}$, equal to or different from each other, are a hydrogen atoms, or C$_1$-C$_{40}$ hydrocarbon radicals optionally containing heteroatoms belonging to groups 13-17 of the Periodic Table of the Elements; preferably R$^{13}$ and R$^{14}$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^{13}$ and $R^{14}$ are linear or branched, saturated or unsaturated $C_1$-$C_{20}$-alkyl radicals, optionally containing heteroatoms belonging to groups 13-17 of the Periodic Table of the Elements; such as a methyl, an ethyl or an isopropyl radical;

$R^{15}$ and $R^{16}$, equal to or different from each other, are hydrogen atoms or $C_1$-$C_{40}$ hydrocarbon radicals optionally containing heteroatoms belonging to groups 13-17 of the Periodic Table of the Elements; preferably $R^{15}$ and $R_{16}$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements;

preferably $R^{15}$ is a hydrogen atom or a linear or branched, cyclic or acyclic $C_1$-$C_{20}$-alkyl radical; more preferably $R^{15}$ is a methyl or ethyl radical;

preferably $R^{16}$ is a $C_1$-$C_{40}$-alkyl, $C_6$-$C_{40}$-aryl or a $C_7$-$C_{40}$-arylalkyl; more preferably $R^{16}$ is a moiety of formula (IV)

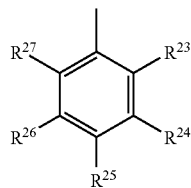

(IV)

wherein $R^{23}$, $R^{24}$, $R^{25}$, $R^{26}$ and $R^{27}$, equal to or different from each other, are hydrogen atoms or $C_1$-$C_{20}$ hydrocarbon radicals; preferably $R^{23}$, $R^{24}$, $R^{25}$, $R^{26}$ and $R^{27}$ are hydrogen atoms or linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals; preferably $R^{23}$, and $R^{26}$ are a hydrogen atoms; $R^{24}$, $R^{25}$ and $R^{26}$ are preferably hydrogen atoms or linear or branched, cyclic or acyclic, $C_1$-$C_{10}$-alkyl radicals;

$T^1$ has the same meaning described above.

In particular, when metallocene compounds of formula (II) and (III) are used in the process of the present invention, it is possible to obtain a 1-butene propylene copolymer having a r1×r2 reactivity ratio of about 1. In fact, it ranges from 0.85 to 1.20, preferably from 0.90 to 1.10, more preferably from 0.95 to 1.05. This fact permits to easily tune the comonomer content in the copolymer, since the composition of the reaction medium, i.e. the content of liquid propylene in the 1-butene/propylene mixture is very close to the comonomer content of the final copolymer.

When metallocene compounds of formula (II) and (III) are used in the process of the present invention, isotactic, crystalline or crystallisable 1-butene/propylene polymers having an intrinsic viscosity (I.V.) measured in tetrahydronaphtalene THN at 135° C. higher than 1 dl/g; preferably higher than 1.2 dl/g are obtained.

Alumoxanes used as component b) can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The alumoxanes used in the process according to the invention are considered to be linear, branched or cyclic compounds containing at least one group of the type:

wherein the substituents U, same or different, are defined above.

In particular, alumoxanes of the formula:

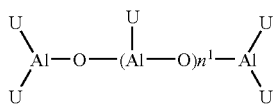

can be used in the case of linear compounds, wherein $n^1$ is 0 or an integer of from 1 to 40 and the substituents U are defined as above; or alumoxanes of the formula:

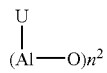

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are:

tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluorophenyl)-propyl]aluminium, tris[2-(4-chloro-phenyl)-propyl] aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl] aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBA), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Bronsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Tributylammoniumtetra(pentafluorophenyl)aluminate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylcarbeniumtetrakis(pentafluorophenyl)borate,
Triphenylcarbeniumtetrakis(pentafluorophenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

Additional examples of compounds of formula $D^+E^-$ that can be used according to the present invention are described in WO 04/005360, WO 02/102811 and WO 01/62764.

Organic aluminum compounds used as compound iii) are those of formula $H_jAlU_{3-j}$ or $H_jAl_2U_{6-j}$ as described above.

The molecular weight distribution can be varied by using mixtures of different metallocene compounds or by carrying out the polymerization in several stages which differ as to the polymerization temperature and/or the concentrations of the molecular weight regulators and/or the monomers concentration. Moreover by carrying out the polymerization process by using a combination of two different metallocene compounds a polymer endowed with a broad melting is produced.

A further advantage of the process of the present invention is that by using a mixtures of comonomers as reaction medium in the given percentages, it is possible to increase the activity of the catalyst system, i.e. there is a strong activating effect due to the high concentration of propylene. As shown in the examples this effect has a maximum when the propylene content in the liquid phase ranges from 25% from 40% by weight.

The content of the propylene comonomer in the 1-butene propylene copolymer obtained with the process of the present invention depends on the metallocene compound used in the catalyst system and from the composition of the polymerization medium.

The copolymers obtained with the process of the present invention are isotactic, and crystalline or crystallisable. For the purpose of the present invention the term isotactic means that the isotactic triads (mm) measured as reported below are higher than 50%; preferably isotactic triads (mm) are higher than 70%; more preferably isotactic triads (mm) are higher than 90%.

For the purpose of the present invention the term crystalline means that the copolymers have a melting point measurable by using differential scanning calorimetry (DSC) according to the method described below.

For the purpose of the present invention the term crystallizable means that the polymers show a melting point as described below after being subjected to a thermal or mechanical stress such as annealing or moulding.

The obtained copolymers show also plastomeric properties and have an optimum balance of properties.

EXAMPLES

All chemicals must be handled using standard Schlenk techniques.

Methylalumoxane (MAO) was received from Albemarle as a 30% wt/wt. toluene solution and used as such.

Pure triisobutylaluminum (TIBA) was used as such.

Isododecane was purified over alumina to reach a water content below 10 ppm.

A 110 g/L TIBA/isododecane solution was obtained by mixing the above components.

Polymer Analysis

I.V. Intrinsic viscosities were measured in tetrahydronaphtalene THN at 135° C.

GPC. Average molecular weights and molecular weight distributions for all the samples were measured using a Waters 150C ALC/GPC instrument (Waters, Milford, Mass., USA) equipped with four mixed-gel columns PLgel 20 µm Mixed-A LS (Polymer Laboratories, Church Stretton, United Kingdom). The dimensions of the columns were 300×7.8 mm. The solvent used was TCB and the flow rate was kept at 1.0 mL/min. Solution concentrations were 0.1 g/ dL in 1,2,4 trichlorobenzene (TCB). 0.1 g/L of 2,6- di-t-butyl-4-methyl phenol (BHT) was added to prevent degradation and the injection volume was 300 µL. All the measurements were carried out at 135° C. GPC calibration is complex, as no well-characterized narrow molecular weight distribution standard reference materials are available for 1-butene polymers. Thus, a universal calibration curve was obtained using 12 polystyrene standard samples with molecular weights ranging from 580 to 13,200,000. It was assumed that the K values of the Mark-Houwink relationship were: $K_{PS}=1.21\times 10^{-4}$, dL/g and $K_{PB}=1.78\times 10^{-4}$ dL/g for polystyrene and poly-1-butene respectively. The Mark-Houwink exponents α were assumed to be 0.706 for polystyrene and 0.725 for poly-1-butene. Even though, in this approach, the molecular parameters obtained were only an estimate of the hydrodynamic volume of each chain, they allowed a relative comparison to be made.

DSC. The melting points of the polymers ($T_m$) were measured by Differential Scanning Calorimetry (DSC) on a Perkin Elmer DSC-7 calorimeter equipped with Pyris 1 software, in the Solid State Properties (FE-PPC) laboratory, previously calibrated at indium and zinc melting points with particular attention in determining the baseline with required accuracy. The preparation of the samples, for calorimetric investigations, has been performed by cutting them into small pieces by using a cutter. The weight of the samples in every DSC crucible was kept at 6.0±0.5 mg.

The weighted sample was sealed into aluminum pans and heated to 180° C. at 10° C./minute the temperature peak was token as Tm(I). The sample was kept at 180° C. for 5 minutes to allow a complete melting of all the crystallites, then cooled to 20° C. at 10° C./minute. After standing 2 minutes at 20° C., the sample was heated for the second time to 180° C. at 10° C./min. In this second heating run, the peak temperature was taken as the melting temperature (Tm(II)) and the area of the peak as its melting enthalpy ($\Delta H_f$).

All specimens for mechanical testing were cut from compression moulding plaques. The tensile modulus was measured accordingly to ISO527-1 on a 2 mm thick plate, tensile properties and Tg (tan δ) are obtained via DMTA measurements accordingly to ASTM 5026, 4092 and 4065. The specimen size for DMTA test is approx. 40 mm long overall, 20 mm inter-clamp length, 6 mm width and thickness was 1 mm. Specimen is clamped in the SEIKO DMS 6100 tensile DMTA. The applied frequency is 1 Hz. Specimens are heated from −80° C. to +140° C. with 2° C./min as heating rate; specimens are re-clamped at the low temperature.

Compression set have been measured according to ASTM D395B type 1.

Shore Hardness D was measured according to ISO 868.

NMR analysis. $^{13}$C-NMR spectra were acquired on a DPX-400 spectrometer operating at 100.61 MHz in the Fourier transform mode at 120° C. When the polymer is rich in propylene (higher than 70% by mol) the peak of the isotactic PPPPP methyl was used as internal reference at 21.8.

The samples were dissolved in 1,1,2,2-tetrachloroethane-$d_2$ at 120° C. with a 8% wt/v concentration. Each spectrum was acquired with a 90° pulse, 15 seconds of delay between pulses and CPD (waltz16) to remove $^1H-{}^{13}C$ coupling. About 1000-1500 transients were stored in 32K data points using a spectral window of 6000 Hz.

The peak of the $2B_2$ carbon (nomenclature according to J. C. Randall, JMS-REV. Macromol. Chem. Phys. C29 (2 & 3), 201-317-1989) of the mmmm BBBBB pentad of the isotactic copolymers was used as internal reference at 27.73.

While the spectra of the atactic and syndiotactic copolymers were calibrated using an instrumental parameter determined from the previous calibration, which gives the sequence Sαα of BB in syndiotactic $C_3C_4$ copolymers in the range 40.90-40.40 ppm, and the sequence Sαα of BB in atactic $C_3C_4$ copolymers in the range 40.74-39.86 ppm.

The assignments of the C4C3 copolymers and the evaluation of composition were made according to H. N. Cheng, Journal of Polymer Science, Polymer Physics Edition, 21, 573 (1983)

The composition was calculated as follow using the Sαα carbons.

$PP=S\alpha\alpha(47.35-46.35 \text{ ppm})/\Sigma$ $BP=S\alpha\alpha(44.00-43.00 \text{ ppm})/\Sigma$ $BB=S\alpha\alpha(40.55-39.95 \text{ ppm})/\Sigma$ Where $\Sigma=\Sigma S\alpha\alpha$ The total amount of 1 butene and propylene as molar percent is calculated from diads using the following relations:

$[P]=PP+0.5BP$ $[B]=BB+0.5BP$

Owing to the overlap between sequences due to stereoerrors and to comonomer in copolymers with $C_3$ up to 50 mol %, the stereoregularity of the B centered triads (PBP BBP and BBB), as mm content, can be evaluated dividing the $CH_2$ branch region in 2 areas A and B where:

A is the area from 28.4 to 27.45 ppm and represents the XBX mm triads

B is the area from 27.45 to 26.0 ppm and represents the XBX mr+rr triads (where X can be either B or P)

Therefore the content of isotactic triads XBX mm is given by $XBX_{mm}=100*A/(A+B)$ The composition and isotacticity of the C3C4 copolymers is given in the following table a.

TABLE a

| Ex | C4 % wt | C3 % wt | C4 % mol | C3 % mol | XBXmm % mol |
|---|---|---|---|---|---|
| 2 | 86.8 | 13.2 | 83.2 | 16.8 | 92.9 |
| 3 | 74.9 | 25.1 | 69.1 | 30.9 | 94.6 |
| 4 | 65.2 | 34.8 | 58.4 | 41.6 | 93.6 |
| 5 | 53.4 | 46.6 | 46.2 | 53.8 | 98.7 |
| 7 | 84.8 | 15.2 | 80.8 | 19.2 | 96.3 |
| 8 | 76.3 | 23.7 | 70.7 | 29.3 | 98 |
| 9 | 62.4 | 37.6 | 55.5 | 44.5 | 97.6 |
| 10 | 53.1 | 46.9 | 45.9 | 54.1 | 98.2 |

Determination of the Product of the Reactivity Ratio r1×r2

The product of reactivity ratios are obtained from $^{13}$C NMR triad distribution according to C. J. Carman, R. A. Harrington and C. E. Wilkes, *Macromolecules*, 10, 536 (1977) using the following expressions.

Butene/Propylene Copolymers:

$$r_1 r_2 = 1 + \left(\frac{[PPP]+[BPP]}{[BPB]}+1\right) - \left(\frac{[B]}{[P]}+1\right)\left(\frac{[PPP]+[BPP]}{[BPB]}+1\right)^{0.5}$$

Metallocene Compounds

Dimethylsilyl{(2,4,7-trimethyl-1-indenyl)-7-(2,5-dimethyl-cyclopenta[1,2-b:4,3-b']-dithiophene)}zirconium dimethyl (A-1) was prepared according to the procedure described in EP 04101020.8.

rac dimethylsilandiylbis-6-[2,5-dimethyl-3-(2',5'-dimethyl-phenyl)cyclopentadienyl-[1,2-b]-thiophene]zirconium dichloride (A-2) was prepared according to the procedure described in WO 01/44318.

Preparation of the Catalyst System C-1 in a 20 Lt. jacketed reactor were charged at room temperature under nitrogen atmosphere 2390 g of a 110 g/Lt. TIBA solution in isododecane (3.11 L) and 800 mL of a 30% wt./wt. MAO solution in toluene The resulting alkyl mixture was stirred at 50° C. for 1 h. Then 7.09 g of A-1 (13.1 mmol) were suspended at room temperature in 500 g of isododecane and charged under nitrogen atmosphere into the reactor. After 1 h stirring at 50° C., the reaction mixture was diluted with 0.52 Lt. (702 g) of isododecane to reach a concentration of total catalyst (A-1 plus MAO plus TIBA) of 100 g each Lt. of solution. The resulting catalyst solution was discharged from the reactor and used as such. This catalyst solution was analysed and it resulted: $Al_{TOT}/Zr=429$ (theoretical value 396), Al=3.35% wt. (theoretical value 3.32), Zr=264 ppm (theoretical value 283). The concentration of the metallocene resulted to be 1.28 mg of A-1 for each mL of solution. The catalyst solution resulted composed of toluene=10.90% wt., isododecane=76.14% wt., MAO=4.67% wt., TIBA=8.11% wt. and metallocene A-1=0.17% wt.

Preparation of the Catalyst System C-2

50.2 mg of A-2 were charged at room temperature under nitrogen atmosphere into a 50 mL Schlenk flask, equipped with a magnetic stirrer. At the same time 30 mL of MAO 30% wt./wt. in toluene were charged at room temperature under nitrogen atmosphere into a 100 mL Schlenk flask and slowly diluted with 60 mL of toluene to obtain 90 mL of a MAO 9.1% wt./vol. solution in toluene. 17.7 mL of this alkyl solution (27.70 mmol, $Al_{MAO}/Zr=400$) were then added at room temperature to the metallocene A-2 obtaining an orange-red catalytic solution (after 10 min stirring), which was tested as such in polymerization. The concentration of A-2 resulted to be 2.84 mg of metallocene for each mL of solution.

Polymerization General Procedure 6 mmol of $Al(i-Bu)_3$ (as a 1M solution in hexane) and the amounts of 1-butene and propylene listed in Table 1 were charged at room temperature in a 4 L jacketed stainless-steel autoclave, equipped with magnetically driven stirrer and a 35-mL stainless-steel vial, connected to a thermostat for temperature control, previously purified by washing with an Al(i-Bu)$_3$ solution in hexane and dried at 50° C. in a stream of nitrogen. No further monomers were fed during the polymerization. The autoclave was then thermostated at the polymerization temperature (70° C.), and then 1 mL (for catalyst system C-1) or 0.5 mL (for catalyst system C-2) of the solution containing the catalyst/cocatalyst mixture was injected in the autoclave by means of nitrogen pressure through the stainless-steel vial, and the polymerization carried out at constant temperature for 1 h. Then stirring is interrupted; the pressure into the autoclave is increased with nitrogen. The bottom discharge valve is opened and the monomers/copolymer mixture is discharged into a heated steel tank containing water at 70° C. The tank heating is switched off and a flow of nitrogen at 0.5 bar-g is fed. After cooling at room temperature, the steel tank is opened and the wet polymer collected. The wet polymer is dried in an oven under reduced pressure at 70° C. The polymerization conditions and the characterizations of the polymer obtained are reported in tables 1 and 2. Some polymer samples have been analyzed in order to determine their mechanical properties, the results are reported in table 3.

TABLE 1

| Ex | catalyst system | mg of metallocene | % wt butene liquid phase | % wt propylene liquid phase | butene, g total fed | propylene g total fed | P bar (final) |
|---|---|---|---|---|---|---|---|
| 1* | C-1 | 1.28 | 100 | 0 | 1350 | 0 | 10.2 |
| 2 | C-1 | 1.28 | 90 | 10 | 1203 | 139 | 12.5 |
| 3 | C-1 | 1.28 | 80 | 20 | 1051 | 273 | 15 |
| 4 | C-1 | 1.28 | 70 | 30 | 904 | 403 | 17 |
| 5 | C-1 | 1.28 | 60 | 40 | 760 | 530 | 18.5 |
| 6* | C-2 | 1.42 | 100 | 0 | 1350 | 0 | 10.1 |
| 7 | C-2 | 1.42 | 90 | 10 | 1203 | 139 | 13.5 |
| 8 | C-2 | 1.42 | 80 | 20 | 1051 | 273 | 15.4 |
| 9 | C-2 | 1.42 | 70 | 30 | 904 | 403 | 17.8 |
| 10 | C-2 | 1.42 | 60 | 40 | 760 | 530 | 19.1 |

*comparative

TABLE 2

| Ex | Yield (g) | Activity kg/ $g_{MC}$/h | I.V. (dL/g) THN | $M_w/M_n$ | $C_3$ % mol | $r_1 \times r_2$ | $T_m(II)$ ° C. | mm % |
|---|---|---|---|---|---|---|---|---|
| 1* | 42 | 33 | 2.2 | 2.1 | 0 | — | 104 | n.a. |
| 2 | 78 | 61 | 2.0 | 2.1 | 16.8 | 1.03 | 72 + 98 | 92.9 |
| 3 | 137 | 107 | 1.8 | 2.1 | 30.9 | 0.99 | 56§ | 94.6 |
| 4 | 187 | 146 | 1.7 | 2.1 | 41.6 | 1.12 | 56§ | 93.6 |
| 5 | 177 | 138 | 1.6 | 3.0 | 53.8 | 1.08 | 59§ | 98.7 |
| 6* | 191 | 135 | 1.3 | 2.0 | 0 | — | 108.3 | n.a. |
| 7 | 215 | 152 | 1.3 | 2.0 | 19.2 | 1.05 | 83.2 | 96.3 |
| 8 | 267 | 188 | 1.3 | 2.0 | 29.3 | 1.02 | 63.1 | 98 |
| 9 | 299 | 211 | 1.3 | 1.9 | 44.5 | 0.93 | 63.5 | 97.6 |
| 10 | 387 | 273 | 1.3 | 2.0 | 54.1 | 1.12 | 66.6 | 98.2 |

*comparative
§$T_m(I)$
n.a. not available

TABLE 3

| | | Mechanical properties of C4C3 | | | | |
|---|---|---|---|---|---|---|
| | C3 | $T_g$ | | Tensile Modulus | | |
| | % | (DMTA, tanδ) | | (DMTA, MPa) | | |
| Ex | mol | (°C.) | M (23°C.) | M (50°C.) | M (70°C.) | |
| 2 | 16.8 | −12 | 180 | 84 | 34 | |
| 3 | 30.9 | −9 | 160 | 41 | 0 | |
| 4 | 41.6 | −12 | 115 | 16 | 0 | |
| 5 | 53.8 | −12 | 130 | 36 | 0 | |
| 10 | 54.1 | −10 | 200 | 84 | 16 | |

| | Tensile properties | | | | Compression | | |
|---|---|---|---|---|---|---|---|
| | Stress at | Elong. | Stress | Elong. | Set | | |
| Ex | Y. (MPa) | at Y. (%) | at B. (MPa) | at B. (%) | CS (23°C.) | CS (70°C.) | Shore D |
| 2 | 8.9 | 15 | 34.5 | 420 | — | — | 65 |
| 3 | 6.3 | 13 | 27.3 | 460 | 72 | 90 | 38 |
| 4 | 5.8 | 15 | 27.1 | 540 | 65 | 96 | 37 |
| 5 | 6.5 | 13.9 | 28.9 | 623 | 66 | 92 | 38 |
| 10 | 11.2 | 14.4 | 28.1 | 673 | 56 | 97 | 46 |

The invention claimed is:

1. A solution polymerization process for obtaining isotactic, crystalline or crystallisable 1-butene/propylene polymers containing up to 55% by mol of propylene derived units, comprising contacting under polymerization conditions at a polymerization temperature ranging from 50°C. to 90°C., 1-butene and propylene in the presence of a catalyst system obtained by contacting:

a) at least one metallocene compound;
b) an alumoxane or a compound that forms an alkyl metallocene cation; and optionally
c) an organo aluminum compound;

wherein a polymerization medium consists of a mixture of 1-butene and propylene wherein a content of propylene in the liquid phase ranges from 1% to 60% by weight; and wherein the catalyst system is not supported on an inert carrier.

2. The process according to claim 1 wherein the polymerization temperature ranges from 60°C. to 80°C.

3. The process according to claim 1 wherein the propylene content in the liquid phase of the polymerization medium ranges from 5% to 60% by weight.

4. The process according to claim 1 wherein the 1-butene/propylene polymers are 1-butene/propylene copolymers containing from 5% by mol to 55% by mol of propylene derived units.

5. The process according to claim 1 wherein the at least one metallocene compound has formula (II) or (III):

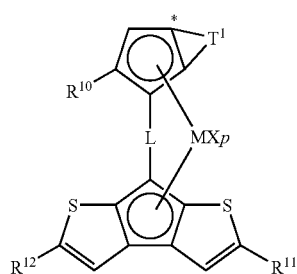

(II)

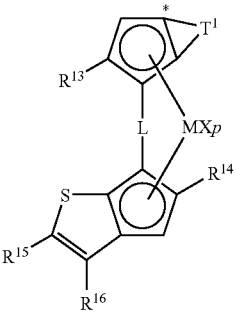

(III)

wherein

M is a transition metal belonging to group 4, 5 or to the lanthanide or actinide groups of the Periodic Table of the Elements;

the substituents X, equal to or different from each other, are monoanionic sigma ligands selected from the group consisting of hydrogen, halogen, $R^6$, $OR^6$, $OCOR^6$, $SR^6$, $NR_2^6$ and $PR_2^6$, wherein $R^6$ is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl group, optionally containing one or more Si or Ge atoms;

p is an integer equal to the oxidation state of the metal M minus 2;

L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or $C_7$-$C_{20}$ arylalkylidene radicals optionally containing heteroatoms belonging to groups 13-17 of the Periodic Table of the Elements, and silylidene radical containing up to 5 silicon atoms;

$T^1$ is a moiety of formula (IIa) or (IIb):

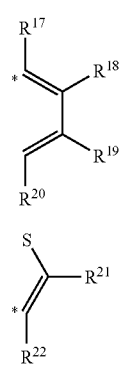

(IIa)

(IIb)

wherein the atom marked with the symbol * bonds the atom marked with the same symbol in the compound of formula (II);

$R^{17}$, $R^{18}$, $R^{19}$ and $R^{20}$, equal to or different from each other, are hydrogen atoms, or $C_1$-$C_{40}$ hydrocarbon radicals optionally containing heteroatoms belonging to groups 13-17 of the Periodic Table of the Elements;

$R^{21}$ and $R^{22}$, equal to or different from each other, are hydrogen atoms or $C_1$-$C_{40}$ hydrocarbon radicals optionally containing heteroatoms belonging to groups 13-17 of the Periodic Table of the Elements, wherein in the compound of formula (II), $R^{10}$ is a hydrogen atom, or a $C_1$-$C_{40}$ hydrocarbon radicals optionally containing heteroatoms belonging to groups 13-17 of the Periodic Table of the Elements;

$R^{11}$ and $R^{12}$, equal to or different from each other, are hydrogen atoms or $C_1$-$C_{40}$ hydrocarbon radicals optionally containing heteroatoms belonging to groups 13-17 of the Periodic Table of the Elements, and wherein in the compound of formula (III), $R^{13}$ and $R^{14}$, equal to or different from each other, are a hydrogen atoms, or $C_1$-$C_{40}$ hydrocarbon radicals optionally containing heteroatoms belonging to groups 13-17 of the Periodic Table of the Elements; and $R^{15}$ and $R^{16}$, equal to or different from each other, are hydrogen atoms or $C_1$-$C_{40}$ hydrocarbon radicals optionally containing heteroatoms belonging to groups 13-17 of the Periodic Table of the Elements.

6. The process according to claim 5 wherein in the compound of formula (II), $R^{10}$ is linear or branched, saturated or unsaturated $C_1$-$C_{20}$-alkyl radicals, optionally containing heteroatoms belonging to groups 13-17 of the Periodic Table of the Elements;

$R^{11}$ and $R^{12}$ are linear or branched, $C_1$-$C_{20}$-alkyl radicals;

$R^{17}$ is a linear or branched, saturated or unsaturated $C_1$-$C_{20}$-alkyl radical, optionally containing heteroatoms belonging to groups 13-17 of the Periodic Table of the Elements;

$R^{18}$ is a hydrogen atom;

$R^{19}$ is a hydrogen atom or a $C_1$-$C_{10}$-alkyl radical; $R^{20}$ is a hydrogen atom or linear or branched, saturated or unsaturated $C_1$-$C_{20}$-alkyl radical, optionally containing heteroatoms belonging to groups 13-17 of the Periodic Table of the Elements;

$R^{21}$ is a hydrogen atom or a linear or branched, cyclic or acyclic $C_1$-$C_{20}$-alkyl radical; and $R^{22}$ is a $C_1$-$C_{40}$-alkyl, $C_6$-$C_{40}$-aryl or a $C_7$-$C_{40}$-arylalkyl radical.

7. The process according to claim 6 wherein in the compound of formula (III), $R^{13}$ and $R^{14}$ are linear or branched, saturated or unsaturated $C_1$-$C_{20}$-alkyl radicals, optionally containing heteroatoms belonging to groups 13-17 of the Periodic Table of the Elements;

$R^{16}$ is a $C_1$-$C_{40}$-alkyl, $C_6$-$C_{40}$-aryl or a $C_7$-$C_{40}$-arylalkyl;

$R^{15}$ is a hydrogen atom or a linear or branched, cyclic or acyclic $C_1$-$C_{20}$-alkyl radical;

$R^{17}$ is a linear or branched, saturated or unsaturated $C_1$-$C_{20}$-alkyl radical, optionally containing heteroatoms belonging to groups 13-17 of the Periodic Table of the Elements;

$R^{19}$ is a hydrogen atom or a $C_1$-$C_{10}$-alkyl radical;

$R^{20}$ is a hydrogen atom or linear or branched, saturated or unsaturated $C_1$-$C_{20}$-alkyl radical, optionally containing heteroatoms belonging to groups 13-17 of the Periodic Table of the Elements;

$R^{21}$ is a hydrogen atom or a linear or branched, cyclic or acyclic $C_1$-$C_{20}$-alkyl radical; and $R^{22}$ is a $C_1$-$C_{40}$-alkyl, $C_6$-$C_{40}$-aryl or a $C_7$-$C_{40}$-arylalkyl radical.

8. The process according to claim 6 wherein $R^{22}$ is a moiety of formula (IV):

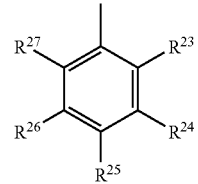

(IV)

wherein $R^{23}$, $R^{24}$, $R^{25}$, $R^{26}$ and $R^{27}$, equal to or different from each other, are hydrogen atoms or $C_1$-$C_{20}$ hydrocarbon radicals.

9. The process according to claim 4 wherein the 1-butene/propylene copolymers have an intrinsic viscosity (I.V.) measured in tetrahydronaphtalene THN at 135°C. higher than 1 dl/g.

* * * * *